(12) United States Patent
Jacobs et al.

(10) Patent No.: US 7,581,463 B2
(45) Date of Patent: Sep. 1, 2009

(54) GEAR MODIFICATION THAT ENABLES DIRECT OFF-CENTER ENGAGEMENT

(75) Inventors: Jos W. Jacobs, Tigard, OR (US); John F. Lombardo, Woodbridge (CA); Carl T. Urban, Portland, OR (US)

(73) Assignee: Xerox Corporation, Norwalk, CT (US)

( * ) Notice: Subject to any disclaimer, the term of this patent is extended or adjusted under 35 U.S.C. 154(b) by 900 days.

(21) Appl. No.: 10/902,059

(22) Filed: Jul. 30, 2004

(65) Prior Publication Data

US 2006/0021457 A1    Feb. 2, 2006

(51) Int. Cl.
*F16H 57/00* (2006.01)
*F16H 55/17* (2006.01)
*F16H 55/10* (2006.01)
*F16H 55/00* (2006.01)

(52) U.S. Cl. .................. 74/406; 74/437; 74/462; 74/457

(58) Field of Classification Search .............. 74/409, 74/406, 405, 440, 435, 457, 434, 410, 413, 74/414, 411, 437, 462
See application file for complete search history.

(56) References Cited

U.S. PATENT DOCUMENTS

| 3,183,726 A | * | 5/1965 | Badger ................. 74/10.8 |
| 3,882,735 A | * | 5/1975 | Shimodaira et al. ......... 74/435 |
| 3,890,853 A | * | 6/1975 | Feltz ..................... 74/435 |
| RE28,926 E | | 8/1976 | Baxter, Jr. |
| 4,276,785 A | * | 7/1981 | Rouverol ................. 74/462 |
| 4,339,895 A | | 7/1982 | Fivian |
| 4,548,531 A | | 10/1985 | Seitelman et al. |
| 4,644,814 A | * | 2/1987 | Rouverol ................. 74/462 |
| 4,653,340 A | * | 3/1987 | LaBate ................... 74/462 |
| 5,092,720 A | | 3/1992 | Abysov et al. |
| 5,135,373 A | | 8/1992 | Cozens |
| 5,315,790 A | | 5/1994 | Kish et al. |
| 5,485,766 A | | 1/1996 | Ishikawa |
| 5,695,425 A | | 12/1997 | Hashimoto et al. |
| 5,704,248 A | | 1/1998 | Knotts |
| 5,893,670 A | | 4/1999 | Brewington et al. |
| 5,944,305 A | * | 8/1999 | Takashima et al. ......... 271/127 |
| 6,205,879 B1 | | 3/2001 | Litvin et al. |
| 6,293,166 B1 | * | 9/2001 | Genter et al. ............ 74/440 |
| 6,342,023 B1 | | 1/2002 | Willmot |
| 6,412,772 B1 | | 7/2002 | Itoh et al. |
| 6,526,849 B1 | | 3/2003 | Ishikawa |
| 6,571,655 B2 | | 6/2003 | Tanaka |

FOREIGN PATENT DOCUMENTS

EP     0 268 325 A2    5/1988

\* cited by examiner

*Primary Examiner*—Thomas R Hannon
*Assistant Examiner*—Justin Krause
(74) *Attorney, Agent, or Firm*—Oliff & Berridge, PLC (57) ABSTRACT

A gear and a method for combining a first gear with a second gear including the steps of moving the first gear relative to the second gear such that a first tooth of the first gear contacts a second tooth of the second gear, pressing the first tooth of the first gear against the second tooth of the second gear such that a resultant force is not directed to a center of at least one of the first gear or the second gear, wherein a torque is created by the resultant force, and rotating at least one of the first gear or the second gear based on the created torque until first teeth of the first gear mesh with second teeth of the second gear.

6 Claims, 8 Drawing Sheets

GEAR MODIFICATION THAT ENABLES DIRECT OFF-CENTER ENGAGEMENT

BACKGROUND OF THE INVENTION

1. Field of Invention

The invention relates to systems and methods that enables direct engagement between two gears.

2. Description of Related Art

Two gears can be structured such that they can become engaged with or disengaged from each other. The two gears can also be structured such that they become engaged with or disengaged from each other (i.e., engage/disengage) once or a plurality of times. For example, the two gears can engage each other once and remain engaged. Alternatively, the two gears can repeatedly engage/disengage each other.

When the two gears engage/disengage each other, a first gear of the two gears moves relative to a second gear of the two gears. When the two gears engage each other, teeth located along an outer circumference of the first gear are placed between teeth located along an outer circumference of the second gear. The rotation of the first gear thus affects the rotation of the second gear and vice versa.

SUMMARY OF THE INVENTION

The gears can be, for example, spur gears, helical gears, bevel gears or worm gears. For illustrative purposes, spur gears will be described. Spur gears include teeth that are parallel to the axis of rotation with top lands located on an outer surface of the teeth that is farthest from a center of the gear and bottom lands located between the top lands. When the first gear translates relative to the second gear along, for example, a linear or circular path, the top land of a tooth of the first gear can first come into contact with the top land of a tooth of the second gear. Tooth-to-tooth contact is thus created. The two gears do not engage each other because the top lands of both gears are in contact with each other. In other words, the teeth of the first gear are not located between the teeth of the second gear.

When the top lands of the two gears come into contact with each other, a contact force is created. This happens with gears that are moving, non-rotating gears with translating gear centers. The contact force is a force created by the movement of the teeth of the first gear against the teeth of the second gear. The contact force, created by the tooth-to-tooth contact, is directed to the center of both gears because the center of radius of the top land is at the center of the gear. The resultant forces are thus directed from the surface of both of the top lands to the center of each gear. As such, the two gears do not rotate relative to each other and thus do not engage each other after contact has been made because of the direction of the resultant force toward the center of each gear. In other words, because the resultant force is directed to the centers of the gears, and not offset from the centers of the gears, a rotating force is not created. Damage can thus occur to the top lands of both teeth because of the force created by the tooth-to-tooth contact.

Furthermore, the combined center-to-center distance between the two gears is increased because the top lands of both gears contact each other. In other words, the teeth of the first gear do not mesh with the teeth of the second gear. With the increased center-to-center distance, a drawer or assembly that is associated with the first gear may not fit into a slot that is associated with the second gear because of the increased distance. As such, the drawer or assembly may not position or lock correctly relative to the slot.

One method of avoiding the tooth-to-tooth contact is to provide narrow teeth. Although the probability for tooth-to-tooth contact is decreased, tooth-to-tooth contact can still occur. Another method of mitigating the bad effects of the tooth-to-tooth contact is to provide a spring loaded or a gravity loaded idler gear that pivots around the center of a first gear. The idler gear pivots around the center of a first gear and moves out of the way of the teeth of the second gear in order to avoid the high forces associated with tooth-to-tooth contact. Spring-loaded shafts that allow the gears to take the impact of the tooth-to-tooth contact can also be used. As a result, the torque that can be transmitted is limited because of the spring. Furthermore, manufacturing costs are increased by using the idler gear or the spring-loaded shafts. Furthermore, in both cases the size of the gear mechanism is increased in order to accommodate the additional structure.

Accordingly, the invention thus provides, among other things, a method and apparatus that allows direct engagement that is simple, inexpensive, increases the life span of the two gears, and allows assemblies to be located properly.

According to one exemplary aspect of the invention, the invention includes a gear with a body with a center and at least one tooth formed on an outer circumference of the body, wherein the at least one tooth includes a top land with a center of radius that is not at the center of the body.

According to another exemplary aspect of the invention, the invention includes a method for combining a first gear with a second gear, comprising moving the first gear relative to the second gear such that a first tooth of the first gear contacts a second tooth of the second gear, pressing the first tooth of the first gear against the second tooth of the second gear such that a resultant force is not directed to the center of at least one of the first gear or the second gear, wherein a torque is created by the resultant force, and rotating at least one of the gears based on the created torque until first teeth of the first gear mesh with second teeth of the second gear.

According to another exemplary aspect of the invention, the invention includes a gear assembly with a shaft with a protrusion located at an end of the shaft, a gear comprising a body with a center and at least one tooth formed on an outer circumference of the body with the at least one tooth including a top land with a center of radius that is not at the center of the gear, wherein the shaft extends through the gear, a hub that is located on a first side of the gear between the protrusion and the first surface, the hub including a slot with a first end and a second end, wherein the protrusion extends through the slot, and an urging member that urges the shaft toward the first end of the slot.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described with reference to the following figures, wherein.

DETAILED DESCRIPTION OF EXEMPLARY EMBODIMENTS

For a general understanding of two gears in accordance with the invention that can be incorporated into, for example, an image forming device, cars, appliances, or any structure currently available or later developed in which two gears are engaged or disengaged, reference is made to FIGS. 3-10, which depicts various embodiments of the invention.

Figure 1:
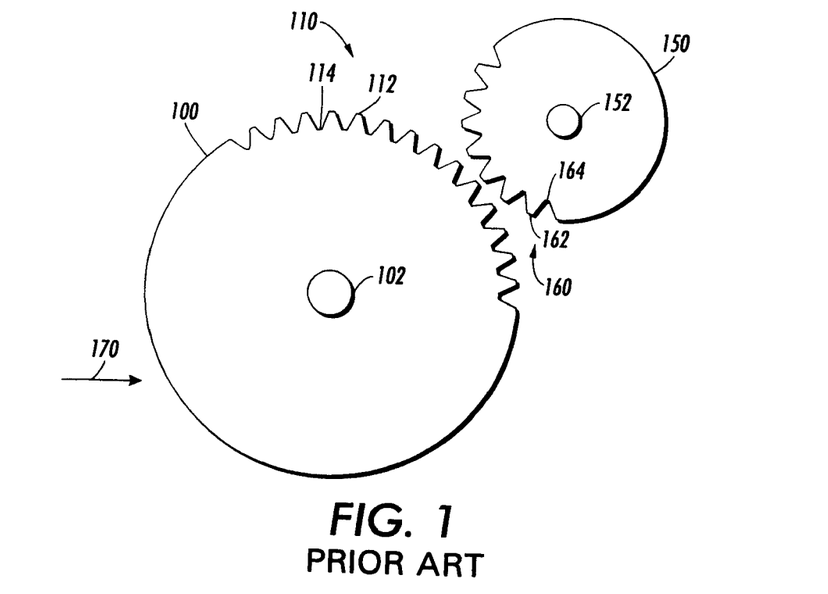
FIG. 1 is a plan view of two gears before engagement.
Figure 2:
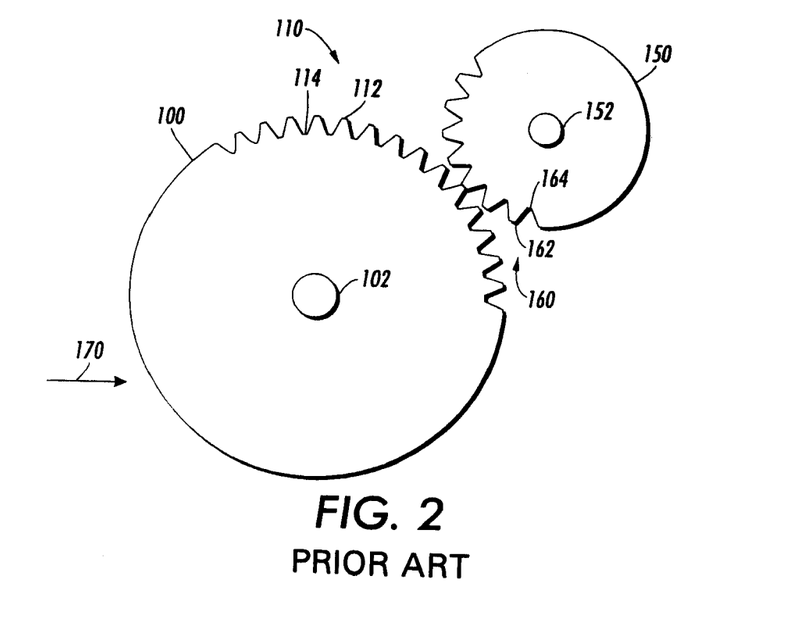
FIG. 2 is a plan view of two gears with tooth-to-tooth contact.

For clarification, FIGS. 1 and 2 illustrate two gears that engage and disengage in accordance with the conventional art. FIG. 1 illustrates two gears before engagement and FIG. 2 illustrates the two gears that are in tooth-to-tooth contact.

As shown in FIGS. 1 and 2, a first gear 100 and a second gear 150 are shown. The first gear 100 includes a center 102 and teeth 110 that surround a part of the outer circumference of the first gear 100. The teeth 110 include top lands 112 located at an outer surface of the teeth 110 of the first gear 100 that is farthest from the center 102 of the first gear 100 and bottom lands 114 located between the top lands 112. Similarly, the second gear 150 includes a center 152 and teeth 160 that surrounds a part of the outer circumference of the second gear 150. The teeth 160 include top lands 162 located at an outer surface of the teeth 160 of the second gear 150 that is farthest from the center 152 of the second gear 150 and bottom lands 164 located between the top lands 162.

The teeth 110 of the first gear 100 and the teeth 160 of the second gear 150 are positioned such that they are opposite each other. Both of the teeth 110, 160 are also structured such that they have a standard involute gear profile.

When the first gear 100 moves in a linear direction 170 toward the second gear 150, the teeth 110 of the first gear 100 contact the teeth 160 of the second gear 150. As the first gear 100 further attempts to move in the linear direction 170, further pressure is applied by the teeth 110 of the first gear 100 against the teeth 160 of the second gear 150. The teeth 110 of the first gear 100 do not move between the teeth 160 of the second gear 150 because both of the top lands 112, 162 have the standard profile where the center of radius of the top land profile of each tooth 110, 160 is at the center of each gear 100, 150. Accordingly, the resultant force created by the contact forces between the two gears 100, 150 is directed to the centers 102, 152 of the gears 100, 150. Further pressure applied between the teeth 110, 160 of the gears 100, 150 thus causes damage to the teeth 110, 160.

In order to avoid the negative effects of tooth-to-tooth contact and to thus reduce the possibility of damage to teeth, the invention thus provides gears with teeth whose top lands include a special or non-standard profile. By providing this profile, the resultant forces that are created by the teeth of two gears are not directed to the center of the gears. The resultant forces are not directed to the centers of the gears because there is no center of radius of each tooth top land that is at the center of each gear. Accordingly, the gears rotate in the direction in which the resultant forces are directed so that the teeth can mesh.

Figure 3A:
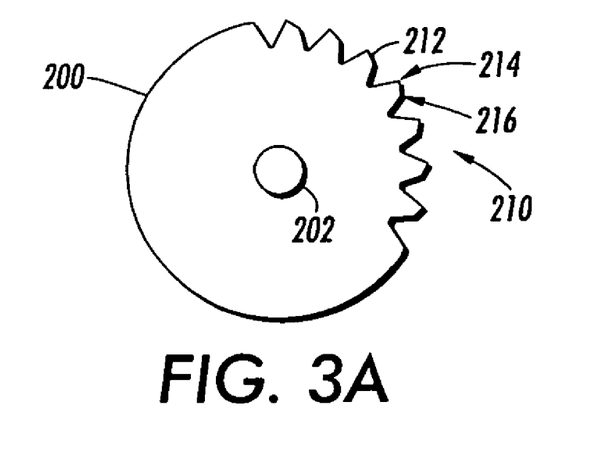
FIGS. 3A and 3B are plan views of two gears in accordance with an embodiment of the invention.
Figure 3B:
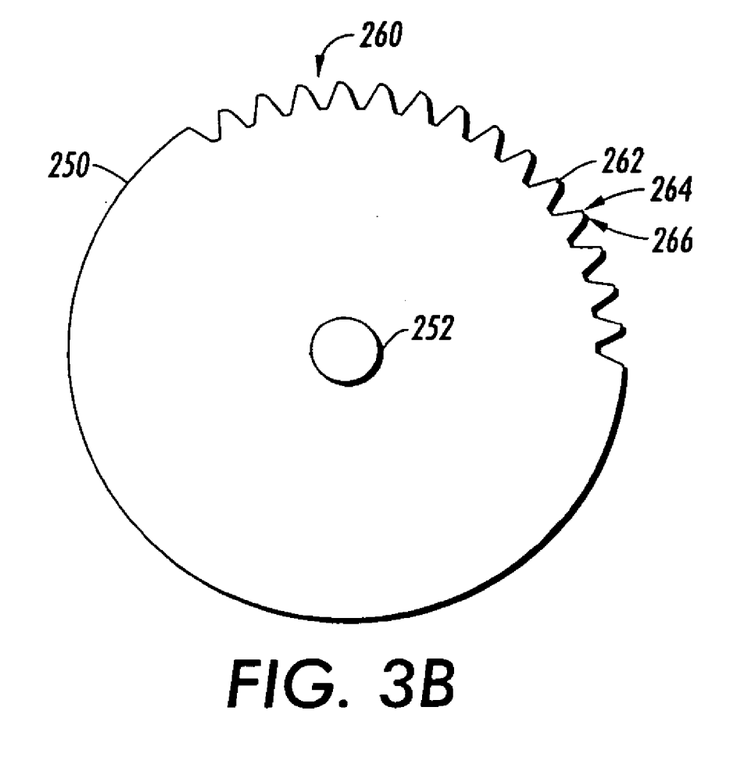

As shown in FIGS. 3A and 3B, two gears that include two modified profiles are shown. As shown in FIG. 3A, a first gear 200 is shown with teeth 210. Each tooth 210 includes a slanted top land 212. In particular, the top land 212 includes a first end 214 that extends farther from a center 202 of the gear 200 than a second end 216. As shown in FIG. 3B, a second gear 250 is shown with teeth 260. Each tooth 260 includes a curved top land 262. In particular, the top land 262 includes a first end 264 that extends farther from a center 252 of the gear 250 than a curved second end 266.

By providing the slanted top land 212 or the curved top land 262, the resultant forces that are created by two opposing teeth coming into contact are not directed toward the center of the gear because the resultant force is perpendicular to the contact surface. In other words, the resultant forces that are created provides a torque around the center of the gears so that a first gear rotates relative to a second gear so that teeth can mesh together. The torque is created because the resultant forces are not directed toward the center of the gear. As should be appreciated, almost any top land profile can be used as long as the center of radius of a top land of at least one tooth is not at the center of the gear so that the resultant forces are not directed toward the center of the gear.

Figure 4:
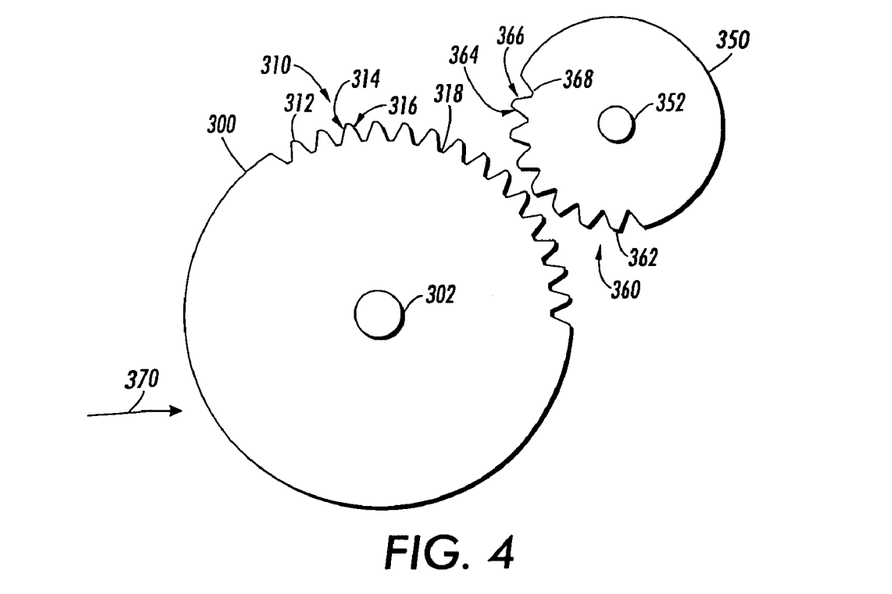
FIG. 4 is a plan view of two gears before engagement according to an embodiment of the invention.
Figure 5:
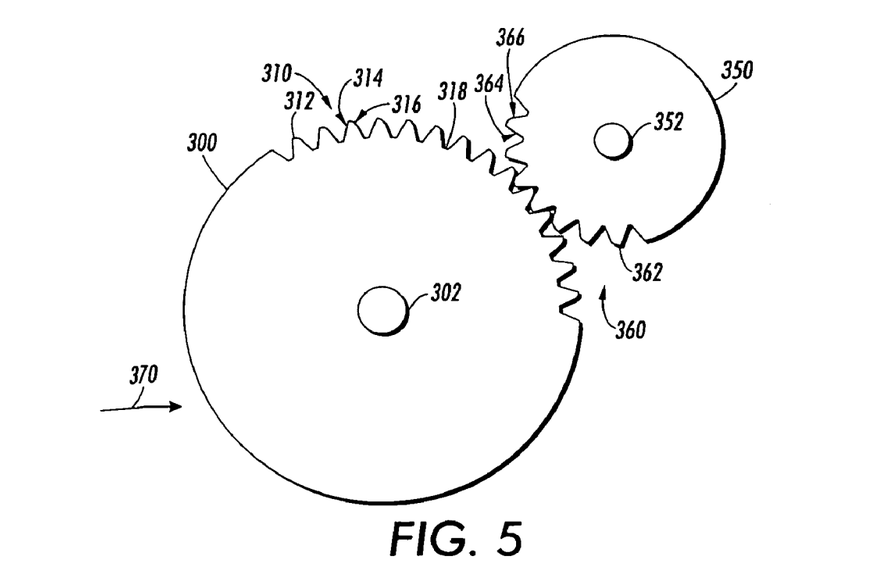
FIG. 5 is a plan view of two gears that are engaged in accordance with an embodiment of the invention.

FIGS. 4 and 5 illustrate two gears that engage and disengage in accordance with an embodiment of the invention. FIG. 4 illustrates two gears before engagement and FIG. 5 illustrates the two gears wherein the teeth mesh together. As should be appreciated, the two gears of FIGS. 4 and 5 are the same as the gear 250 of FIG. 3B.

In FIGS. 4 and 5, a first gear 300 and a second gear 350 are shown. The first gear 300 includes a center 302 and teeth 310 that surround a part of the outer circumference of the first gear 300. The teeth 310 include top lands 312 located at an outer surface of the teeth 310 of the first gear 300 that is farthest from the center 302 of the first gear 300. Similarly, the second gear 350 includes a center 352 and teeth 360 that surround a part of the outer circumference of the second gear 350. The teeth 360 include top lands 362 located at an outer surface of the teeth 360 of the second gear 350 that is farthest from the center 352 of the second gear 350.

The teeth 310 of the first gear 300 and the teeth 360 of the second gear 350 are positioned such that they are opposite each other. Both of the teeth 310, 360 are also structured such that they have a curved top land 312, 362 that slopes from a first end 314, 364 to a second end 316, 366. The curved top lands 312, 362 slope in the same direction. In other words, if the curved top land 312 slopes such that the first end 314 is in a counterclockwise direction from the second end 316, the curved top land 362 also slopes such that the first end 364 is in a counterclockwise direction from the second end 366.

When the first gear 300 moves in a linear direction 370 toward the second gear 350, the teeth 310 of the first gear 300 first contact the teeth 360 of the second gear 350. As the first gear 300 further attempts to move in the linear direction 370, further pressure applied by the teeth 310 of the first gear 300 against the teeth 360 of the second gear 350 creates a contact force with a tangential force component that is not directed toward the centers 302, 352 of the gears 300, 350. By creating the tangential force, a torque around the centers 302, 352 of the gears 300, 350 is thus created. The tangential force and the resultant torque are directed in an opposite direction to a direction in which the top lands 312, 362 curve. In other words, if the top land 312 is curved such that the first end 314 is in a counterclockwise direction from the curved second end 316, the gear 300 rotates in the counterclockwise direction. When the torque is created, both gears 300, 350 are urged to rotate relative to each other. Both gears 300, 350 rotate relative to each other until the teeth 310 mesh with the teeth 360.

During normal conditions when the teeth 310 mesh with the teeth 360, the working length between the two sets of teeth 310, 360 should be maximized. In other words, the length of the teeth 310 between the top lands 312 and the bottom lands 318 should contact most of the length of the teeth 360 between the top land 362 and the bottom land 368. The profiles of the top lands 312, 362 should not transmit torque between the gears 300, 350. In order to maximize the working surface between teeth 310, 360, the first end 314 of the teeth 310 of the first gear 300 is in contact with the first end 364 of the teeth 360 of the second gear 350. As such, the contact surface between the gears 300, 350 is not reduced when the gear 300 rotates in the counterclockwise direction because the area of contact between the teeth 310, 360 is not reduced because the first end 314 of the teeth 310 contact the first end 364 of the teeth 360. In other words, the working length in which the teeth 310, 360 contact an transmit torque is the same as the teeth 112, 162 of FIGS. 1 and 2. As should be appreciated, when the gear 300 is driven in the clockwise direction when the teeth 310, 360 mesh, the first ends 314, 364 would be located in the clockwise direction relative to the second ends 316, 366 in order to maintain the working length.

As shown in FIG. 5, the final positions of the centers 302, 352 of the gears 300, 350 should have a predetermined engagement angle relative to each other and to the tangent of the direction 370. The gears 300, 350 should have a predetermined pressure angle so that the direction in which the resultant force that acts between the two gears 300, 350 (i.e., pressure line) does not force the gears 300, 350 away from each other. In other words, the pressure angle should not exceed a predetermined range. In this embodiment, the engagement angle is an angle defined by a straight line from the center 302 of the gear 300 in the direction 370 and a line that connects the centers 302, 352 of the gears 300, 350. If the engagement angle is equal to or smaller than a predetermined angle, then the gears can be easily disengaged. However, if the engagement angle is greater than the predetermined angle, the rotational force created by one gear against another gear does not drive the gears 300, 350 apart under a load.

As described, at least one gear rotates relative to another gear in order for gears to engage each other. However, it may be difficult to rotate one of the gears. Typically, a shaft extends through or is attached to the center of one or both gears. It may also be difficult to rotate at least one of the shafts. For example, one of the shafts may be connected to a motor or to a rigid device. As such, a significant amount of torque may be required to rotate the gear and shaft connected thereto. When the second gear thus approaches the first gear, some play must exist between the shaft and the second gear so that the teeth of both gears engage with each other when tooth-to-tooth contact occurs.

Figure 6:
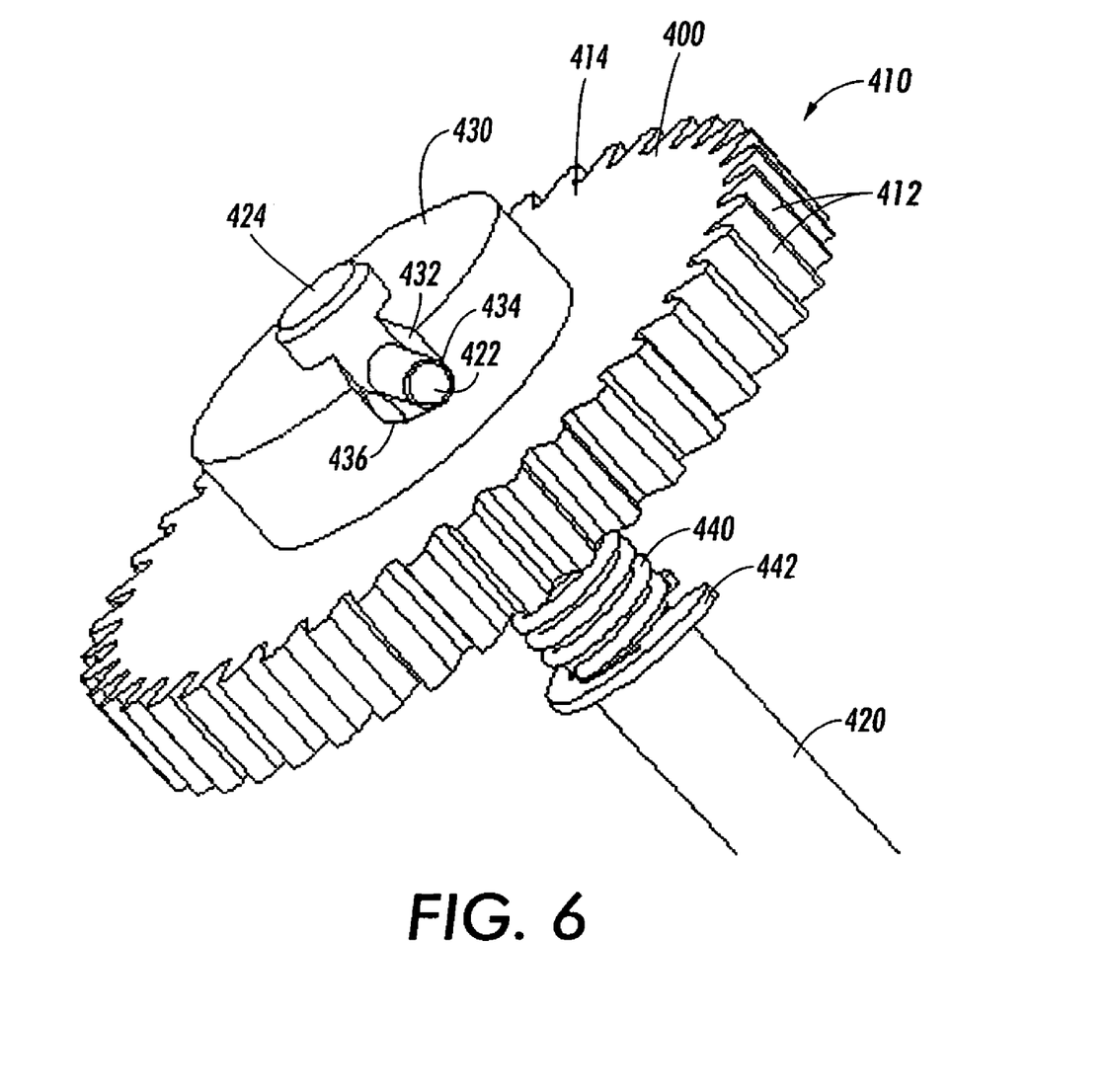
FIG. 6 is a projection view of a gear in accordance with the modification of the invention.

FIG. 6 illustrates an example of a shaft 420 and a gear 400 that is allowed a limited amount of rotation (i.e., play) relative to the shaft 420. The gear 400 includes teeth 410 that surround the outer circumference of the gear 400. Each tooth 410 also includes a top land 412 similar to the top lands 212 of FIG. 3A.

The shaft 420 extends through the center of the gear 400 and includes a pin 422 located at an end 424 of the shaft 420. Attached to or integral with the gear 400 is a hub 430 with a U-shaped slot 432. The U-shaped slot 432 includes a first end 434 that extends closer to the surface 414 of the gear 400 than the second end 436. The slot is also designed so that the pin 422 comes into contact slot 432.

A biasing spring 440 is placed in contact with the gear 400 between a surface of the gear 400 opposite the hub 430 and a ring 442 or shoulder that is attached to or integral with the shaft 420. The spring force of the spring 440 is applied such that the pin 422 is forced toward the surface 414 of the gear 400. As such, the pin 422 moves toward the first end 434 of the slot 432, which is closer to the surface 414 than the second end 436.

When the top lands 412 of the gear 400 come into contact with the top lands of another gear, the gear 400 rotates in the clockwise direction relative to the shaft 420. When the gear 400 moves in the clockwise direction, the pin 422 against the urging force created by the spring 440 moves from the first end 434 of the slot 432 toward the second end 436. When the gear 400 is loaded, the gear 400 rotates back to its original position relative to the shaft 420. As such, the width of the slot between the first end 434 and the second end 436 thus allows for the necessary play. As should be appreciated, the minimum width of the slot 432 should be sufficient such that the gear 400 can rotate by the equivalent of at least one tooth.

In yet other embodiments, the biasing spring 440 is a torsion spring. As should be appreciated, any device currently available or later developed can be used that provides for a limited amount of play with the gear and that returns the gear to a fixed position when disengaged from another gear.

Figure 7:
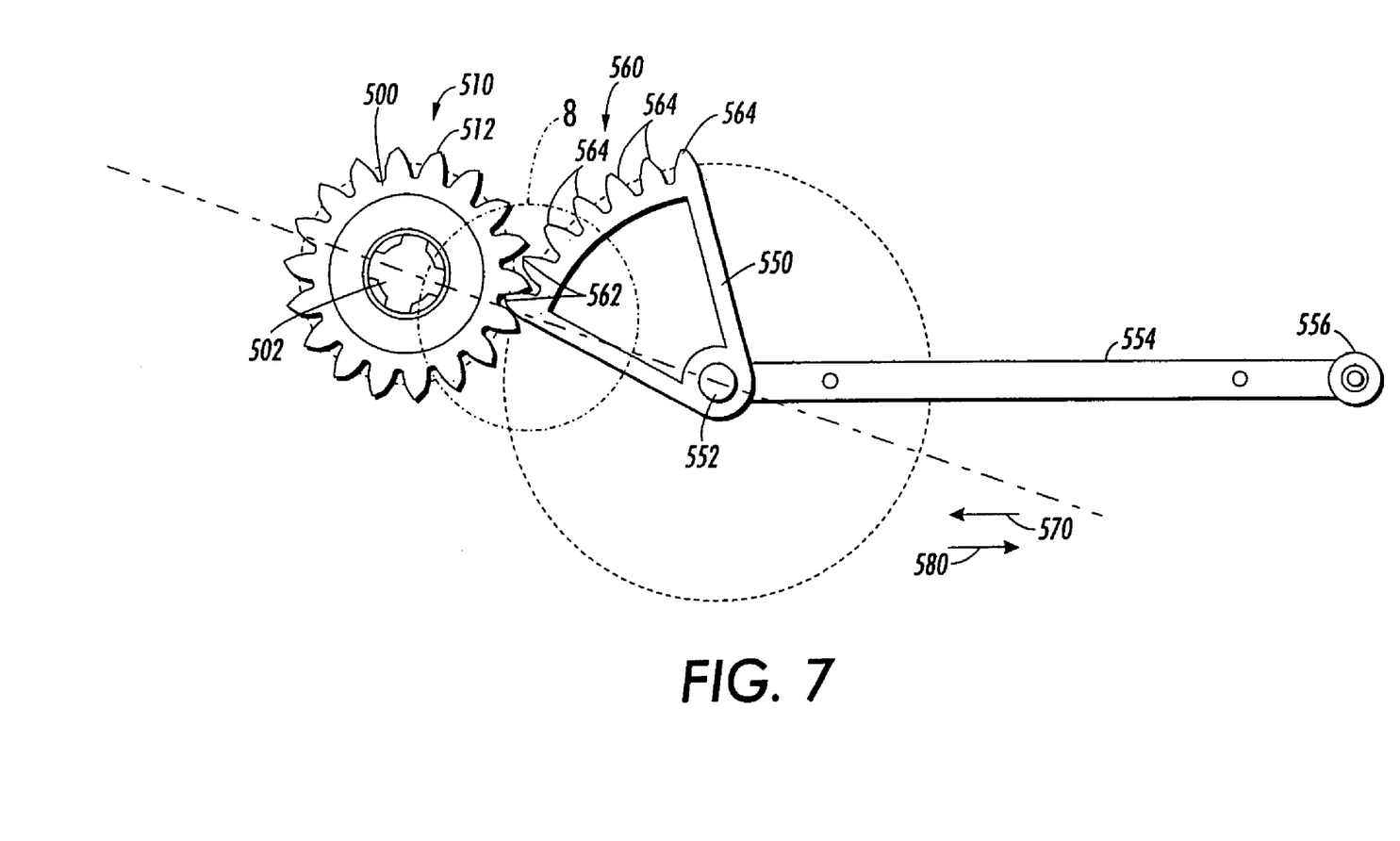
FIG. 7 is a plan view of two gears that are engaged in accordance with a modification of the invention.
Figure 8:
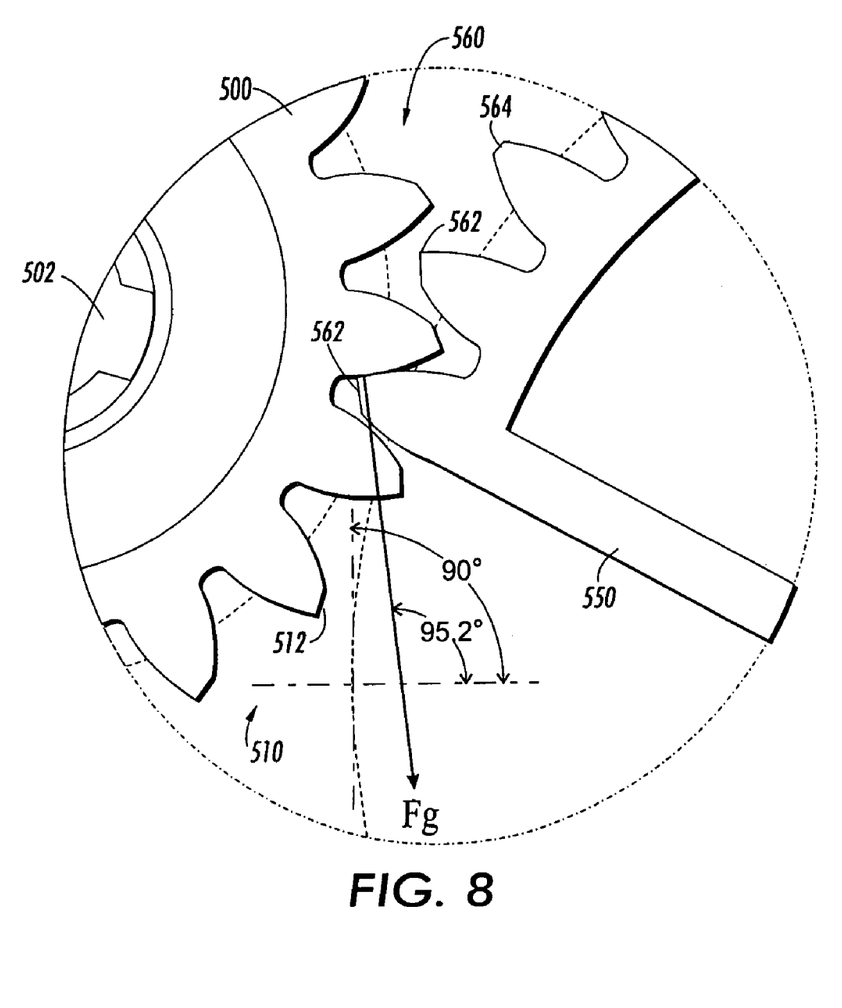
FIG. 8 is an enlarged view of FIG. 7.

FIGS. 7 and 8 illustrates another embodiment of the invention. As shown in FIGS. 7 and 8, a first gear 500 and a second gear 550 are shown. In this embodiment, a significant amount of torque is required to rotate the shaft 502 and the first gear 500. As such, some play must exist with the second gear 550. Also in this embodiment, the structure of the gears 500, 550 is set so that a resultant force that is transferred from the gear 500 to the gear 550 is effectively transferred so that the gear 550 is not forced away from the gear 500.

The first gear 500 includes the shaft 502 that extends therethrough and teeth 510 that surround the outer circumference of the gear 500. Each tooth 510 also includes a top land 512 similar to the top lands 212 of FIG. 3A. The second gear 550 rotates about a shaft 552 of the gear 550. The shaft 552 of the second gear 550 is attached to or integral with an arm 554 that is further attached to a shaft 556. As such, the shaft 552 rotates around the center of the gear 550.

The second gear 550 also includes teeth 560 that surround the outer partial circumference of the gear 550. As should be appreciated, by providing a second gear 550 that is a partial gear, the height of the overall mechanism is reduced when meshed. The second gear 550 also includes two sets of top lands. The first set of top lands 562 are located at the two left most teeth 560 as shown in FIG. 7 and include a modified top land profile similar to the top lands 212 of FIG. 3A. The remainder of teeth 560 may form the second set of top lands 564 that may have a normal profile. In this embodiment, only the two left most teeth 560 include the modified top land profile because when the second gear 550 is moved in the direction 570, only the two left most teeth 560 contact the teeth 510 of the first gear 500. As such, it is only necessary to modify the two left most teeth 560 so that the teeth 510 mesh with the teeth 560. As should be appreciated, more or all of the teeth 560 can include the modified profile and not all of the teeth 510 require the modified profile.

When the gear 550 moves in the direction 570, the top lands 562 of the first two teeth 560 come into contact with the top lands 512 of the teeth 510. When the gear 550 is moved further in the direction 570, torque is created. When the torque is created, the gear 550 rotates in the clockwise direction. However, when using a partial gear for the second gear 550 and a top land 562 with a modified profile, the teeth 560 should preferably mesh with the teeth 510 such that when the gear 500 rotates in a clockwise direction, a sufficient torque is transmitted from the gear 500 to the gear 550 without pushing the gear 550 in a direction 580.

As shown in FIG. 8, when the gear 500 rotates in the clockwise direction because of torque applied by a motor (not shown), a resultant force Fg is exerted on the teeth 560 of the gear 550 by the teeth 510 of the gear 500. This resultant force Fg is created based on the profile of the teeth 510, 560, the position of the gear centers relative to the direction 570, and the torque applied to the gear 500 by the motor. As shown in FIG. 8, the angle of the resultant force Fg is 95.2° created by the clockwise rotation of the gear 500. As should be appreciated, the ideal resultant force angle may be 90°. By providing a resultant force angle between 90° and 95.2°, a minimal amount of force is directed toward the direction 580. Disengagement of the gears 500, 550 is thus avoided. In order to obtain a resultant force between 90° and 95.2°, the gear center locations 502 and/or 552 and/or the tooth face geometry may be modified.

Figure 9:
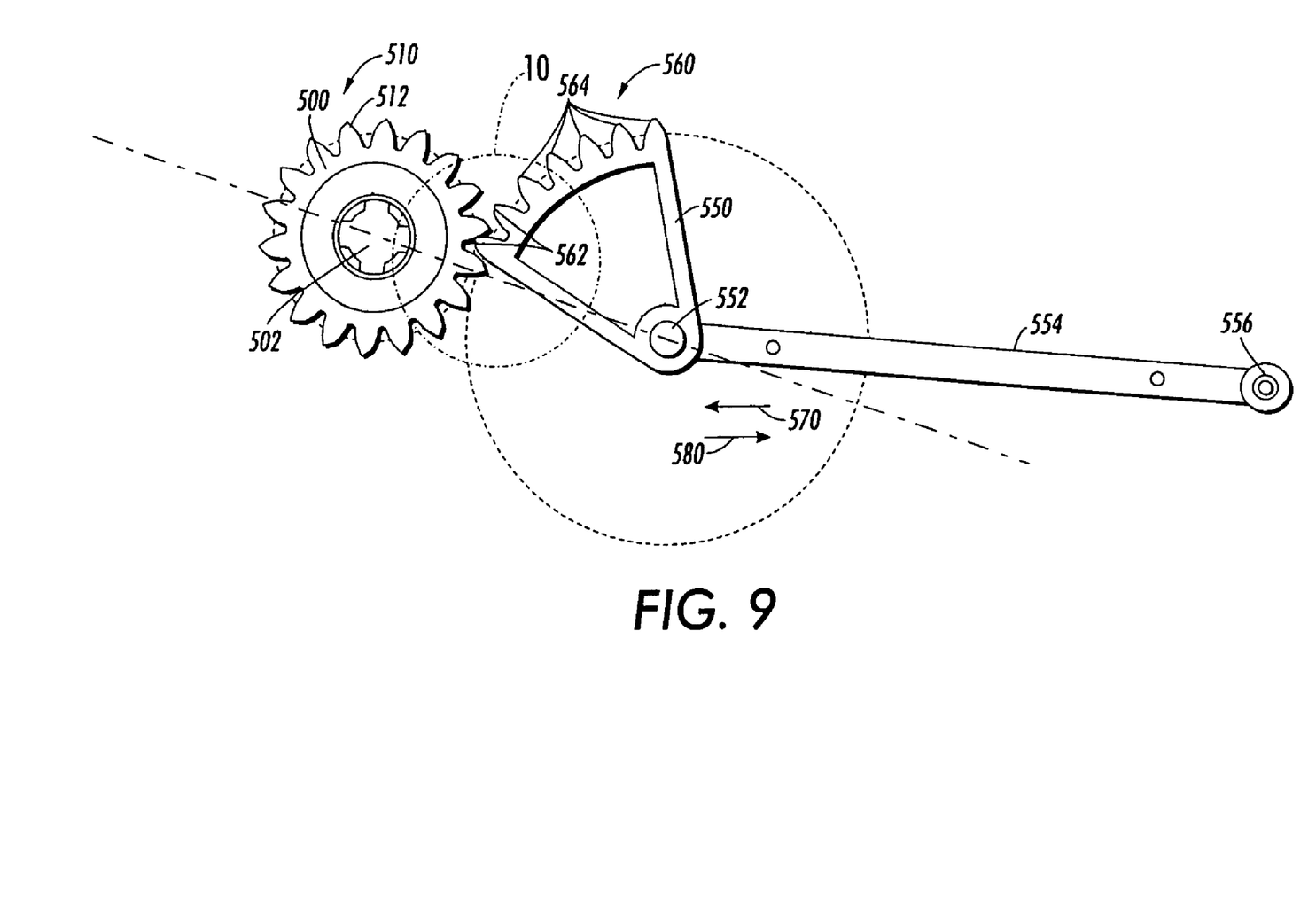
FIG. 9 is a plan view of two gears that are engaged in accordance with a modification of the invention.
Figure 10:
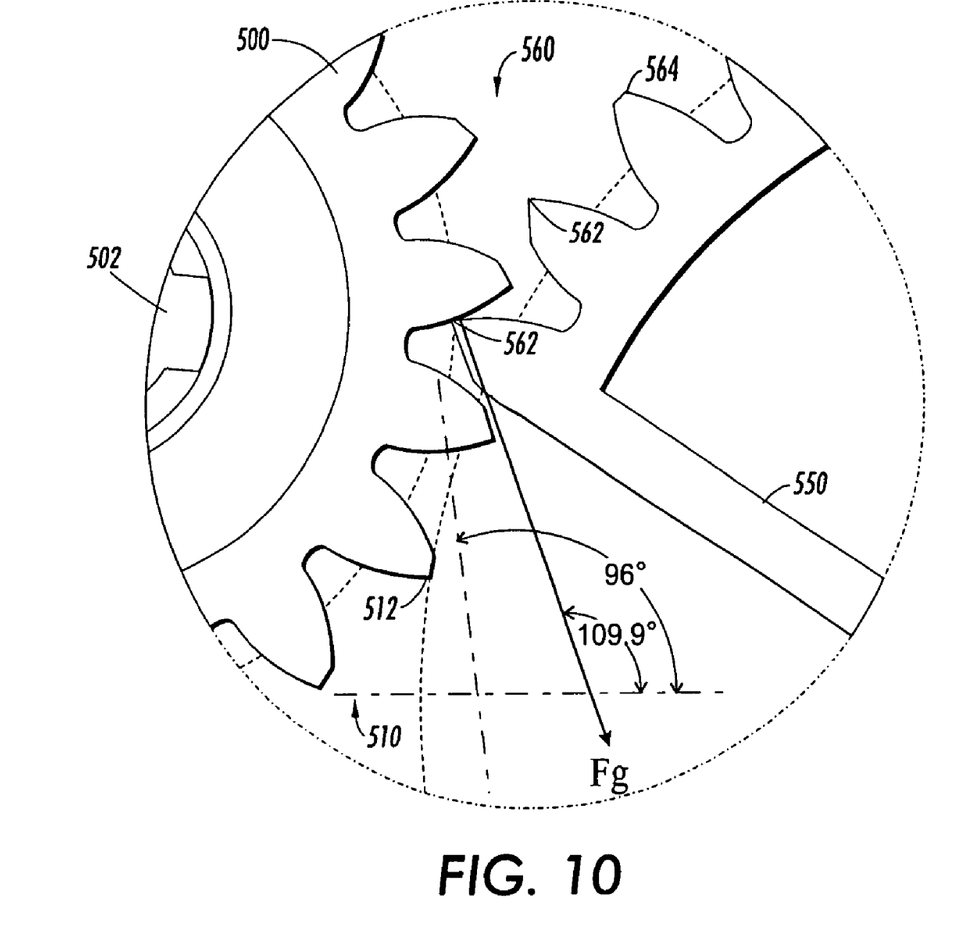
FIG. 10 is an enlarged view of FIG. 9.

On the contrary, as shown in FIGS. 9 and 10, when the teeth 510 of the gear 500 mesh with the teeth 560 of the gear 550, the teeth 560 contact the teeth 510 such that the angle of resultant force created by the clockwise rotation of the gear 500 is 109.9°. The larger angle for the resultant force Fg is created because the initial angle of the gear 550 is excessively rotated clockwise. This results in the working surface of the teeth 510 of the gear 500 hitting the tip of the teeth 560 of the gear 550. This creates a resultant force angle of 109.9° and an additional force directed toward the direction 580. Thus, the possibility of disengagement between the gears 500, 550 is increased.

While this invention has been described in conjunction with various exemplary embodiments, it is to be understood that many alternatives, modifications and variations would be apparent based on the foregoing description. Accordingly, the exemplary embodiments of this invention, as set forth above are intended to be illustrative, and not limiting. Various changes can be made without departing from the spirit and scope of this invention.

What is claimed is:

1. A gear assembly, comprising:
   a first gear mounted for rotation about a first shaft having a first central rotational axis, the first gear having an outer circumference having at least one first tooth, the at least one first tooth having a curved top land with a center of radius of curvature that is offset from the first central rotational axis; and
   a second gear mounted for rotation about a second shaft having a second central rotational axis, the second gear having an outer circumference having at least one second tooth, the at least one second tooth having a curved top land with a center of radius of curvature that is offset from the second central rotational axis,
   wherein the second gear is mounted for linear movement in a direction toward the first gear to cause the respective curved top lands to engage each other, a resultant tangential contact force due to the offset center of radius of curvature of the curved top lands of the first and second gears forcing rotation of the first and second gears relative to each other to ensure engagement and meshing of the first tooth of the first gear and the second tooth of the second gear, and a contact force between the meshing first tooth of the first gear and the meshing second tooth of the second gear having an angle of between 90° and 95.2° as measured relative to an axis connecting the first shaft and the second shaft to minimize forces acting opposite to the linear movement direction to avoid disengagement of the meshed first and second teeth during rotation of the first and second gears.

2. The gear assembly according to claim 1, wherein the second gear is a partial gear.

3. The gear assembly according to claim 1, wherein the second gear has a plurality of second teeth, and only a subset of the second teeth have a top land with the center of radius of curvature that is offset from the second central rotational axis.

4. The gear assembly according to claim 3, wherein at least a leading-most subset of the second teeth of the second gear that first engage the first gear have a top land with the center of radius of curvature that is offset from the second central rotational axis.

5. The gear assembly according to claim 1, further comprising an arm attached to the second shaft.

6. The gear assembly according to claim 1, wherein one of the first and second gears is mounted on its respective shaft with a limited amount of rotation play relative to the shaft, the mounting including a variable width slot and a biasing spring.

* * * * *